(12) United States Patent
Ying et al.

(10) Patent No.: US 11,518,252 B2
(45) Date of Patent: Dec. 6, 2022

(54) BALANCE SCOOTER STARTUP METHOD AND APPARATUS CONTROLLING BALANCE SCOOTER STARTUP

(71) Applicant: HANGZHOU CHIC INTELLIGENT TECHNOLOGY CO., LTD, Zhejiang (CN)

(72) Inventors: Jiawei Ying, Zhejiang (CN); Yunfei Lin, Zhejiang (CN)

(73) Assignee: HANGZHOU CHIC INTELLIGENT TECHNOLOGY CO., LTD, Zhejiang (CN)

( * ) Notice: Subject to any disclaimer, the term of this patent is extended or adjusted under 35 U.S.C. 154(b) by 738 days.

(21) Appl. No.: 16/475,130

(22) PCT Filed: Feb. 14, 2017

(86) PCT No.: PCT/CN2017/073484
§ 371 (c)(1),
(2) Date: Jul. 1, 2019

(87) PCT Pub. No.: WO2018/120358
PCT Pub. Date: Jul. 5, 2018

(65) Prior Publication Data
US 2020/0001725 A1    Jan. 2, 2020

(30) Foreign Application Priority Data

Dec. 29, 2016   (CN) .......................... 201611246327.2

(51) Int. Cl.
*B60L 15/20*      (2006.01)
*B62K 11/00*      (2006.01)

(52) U.S. Cl.
CPC ............ *B60L 15/20* (2013.01); *B62K 11/007* (2016.11); *B60L 2200/24* (2013.01); *B62K 2202/00* (2013.01)

(58) Field of Classification Search
CPC ...................................................... B60L 15/20
See application file for complete search history.

(56) References Cited

U.S. PATENT DOCUMENTS

| 9,376,155 B2 * | 6/2016 | Ying | ....................... B62D 51/02 |
| 2020/0001725 A1 * | 1/2020 | Ying | ....................... B60L 15/20 |

FOREIGN PATENT DOCUMENTS

| CN | 1163212 | 10/1997 |
| CN | 204056178 | 12/2014 |

(Continued)

OTHER PUBLICATIONS

"International Search Report (Form PCT/ISA/210) of PCT/CN2017/073484," dated Sep. 20, 2017, pp. 1-4.

*Primary Examiner* — Michael A Berns
(74) *Attorney, Agent, or Firm* — JCIPRNET

(57) ABSTRACT

A balance scooter startup method and an apparatus controlling balance scooter startup, the balance scooter startup method comprising the following steps: for a balance scooter in a powered-off state, sensing back and forth rocking motion, and rotating an electric motor to generate electricity, and outputting an electrical signal; the electrical signal triggering a power supply module of a control board to start; a battery of the power supply module starting to power the balance scooter, completing the balance scooter startup. The apparatus controlling balance scooter startup is used to detect rocking motion of the balance scooter, rocking of wheels drive the electric motor to generate electricity, and collection of the electrical signal generated by the electric motor controls the balance scooter to start up. The present disclosure is convenient for a user to employ, and improves a usage experience for a user.

10 Claims, 2 Drawing Sheets

---

S10 — For a self-balancing vehicle in a powered-off state, the self-balancing vehicle senses back and forth rocking motion, and an electric motor rotates and generates electricity, and the electrical signal S20 — The electrical signal generated by the electric motor triggers a power supply module of a control board to start S30 — A battery of the power supply module starts to supply power to the self-balancing vehicle, completing self-balancing vehicle startup

(56) References Cited

FOREIGN PATENT DOCUMENTS

| | | |
|---|---|---|
| CN | 104494752 | 4/2015 |
| CN | 205113574 | 3/2016 |
| CN | 105966509 | 9/2016 |
| CN | 205844775 | 12/2016 |
| TW | 511462 | 11/2002 |
| TW | M511462 | 11/2015 |

\* cited by examiner

BALANCE SCOOTER STARTUP METHOD AND APPARATUS CONTROLLING BALANCE SCOOTER STARTUP

CROSS-REFERENCE TO RELATED APPLICATION

This application is a 371 of international application of PCT application serial no. PCT/CN2017/073484, filed on Feb. 14, 2017, which claims the priority benefit of China application no. 201611246327.2, filed on Dec. 29, 2016. The entirety of each of the above mentioned patent applications is hereby incorporated by reference herein and made a part of this specification.

BACKGROUND OF THE INVENTION

1. Field of the Invention

The present disclosure relates to the field of balance scooter technologies, and specifically to a balance scooter startup method and an apparatus controlling balance scooter startup.

2. Description of Related Art

In a driving process of an existing balance scooter, an in-wheel motor disposed in wheels drive the wheels to rotate. In addition, startup of a balance scooter is performed by a physical switch, and in this manner of startup, an operator needs to press a startup key with a hand to make the balance scooter powered on and start up. Because the balance scooter is relatively short and is close to the ground, an operator usually needs to bend down to press the startup key, to make the balance scooter powered on to work. The operation of the startup process is inconvenient, affecting use enthusiasm of users.

SUMMARY OF THE INVENTION

The technical problem to be solved by the present disclosure is to provide a balance scooter startup method, used to detect rocking motion of the balance scooter, rocking of wheels drives the electric motor to generate electricity, and collection of the electrical signal generated by the electric motor controls the balance scooter to automatically start up; the present disclosure is convenient for a user to employ, and improves a usage experience for a user.

To resolve the foregoing technical problem, the present disclosure uses the following technical solution:

A balance scooter startup method, including the following steps:

for a balance scooter in a powered-off state, sensing back and forth rocking motion of a user, and rotating an electric motor to generate electricity, and outputting an electrical signal;

the electrical signal triggering the power supply module of the control board to start; and a battery of the power supply module starting to power the balance scooter, completing the balance scooter startup.

As further improvement of the present disclosure, the electrical signal triggering the power supply module of the control board to start is specifically:

converting the electrical signal into a power supply enabling trigger signal;

the power supply enable trigger signal triggering the power supply module to start;

the power supply module generating a control module working voltage signal and waking up a control module; and after the control module starts, generating a startup holding signal to make the power supply module always keeping an on state.

As further improvement of the present disclosure, the converting the electrical signal into a power supply enable trigger signal includes: disposing a time delay module between the electrical signal and the power supply module.

As further improvement of the present disclosure, the time delay module is an RC time delay circuit.

As further improvement of the present disclosure, a resistor for a capacitor of the RC time delay circuit to discharge is disposed between the RC time delay circuit and the power supply module.

As further improvement of the present disclosure, the converting the electrical signal into a power supply enable trigger signal includes: connecting a diode in series between the electrical signal and the power supply module to prevent a reverse current.

The present disclosure further provides the following technical solution:

An apparatus controlling balance scooter startup, including:

a sensing electricity generation module, for a balance scooter in a powered-off state, sensing back and forth rocking motion of a user, and rotating an electric motor to generate electricity, and outputting an electrical signal;

a power supply module, receiving the electrical signal and outputting a control module working voltage signal; and a control module, receiving the control module working voltage signal and being started, generating a startup holding signal to the power supply module, where a battery of the power supply module starts to power the balance scooter, completing the balance scooter startup.

As further improvement of the present disclosure, the apparatus further includes a power supply enable trigger module, converting the electrical signal into a power supply enable trigger signal.

As further improvement of the present disclosure, the power supply enable trigger module includes a time delay module.

As further improvement of the present disclosure, the time delay module is an RC time delay circuit.

As further improvement of the present disclosure, the RC time delay circuit further includes a resistor disposed between the RC time delay circuit and the power supply module, for a capacitor of the RC time delay circuit to discharge.

As further improvement of the present disclosure, the apparatus further includes a diode connected in series between the electrical signal and the power supply module to prevent reverse current.

The present disclosure has the following beneficial effects:

1. By rocking of the wheels of the balance scooter to drive the electric motor to generate electricity, the electrical signal of electricity generated by the electric motor further generates the power supply enable trigger signal that triggers the power supply module, so that the control module generates the startup holding signal to make the power supply module always keep an on state, power of the balance scooter starts to be supplied by the battery module, and complete the startup motion. The startup process of the balance scooter implemented in the foregoing manner is easy and is convenient for a user to employ.

2. By disposing the time delay module between the electrical signal generated by the electric motor and the power supply module, a balance scooter mistaken startup operation caused by rotation of the wheels of the balance scooter driven by an external force within short time is effectively avoided.

3. The resistor for the capacitor of the time delay circuit to discharge is disposed between the time delay module and the power supply module, to avoid a mistaken startup operation when the balance scooter slightly shocks.

4. By disposing the diode that prevents reverse current, a false motion of the current of the startup holding signal of the power supply module for an electric motor coil is avoided, to effectively protect the electric motor and the power supply module.

DESCRIPTION OF THE EMBODIMENTS

The following clearly and completely describes the technical solutions in the embodiments of the present disclosure with reference to the accompanying drawings in the embodiments of the present disclosure. Obviously, the described embodiments are only some embodiments instead of all embodiments of the present disclosure. All other embodiments obtained by a person of ordinary skill in the art according to the embodiments of the present disclosure without creative efforts shall fall within the protection scope of the present disclosure.

Figure 1:
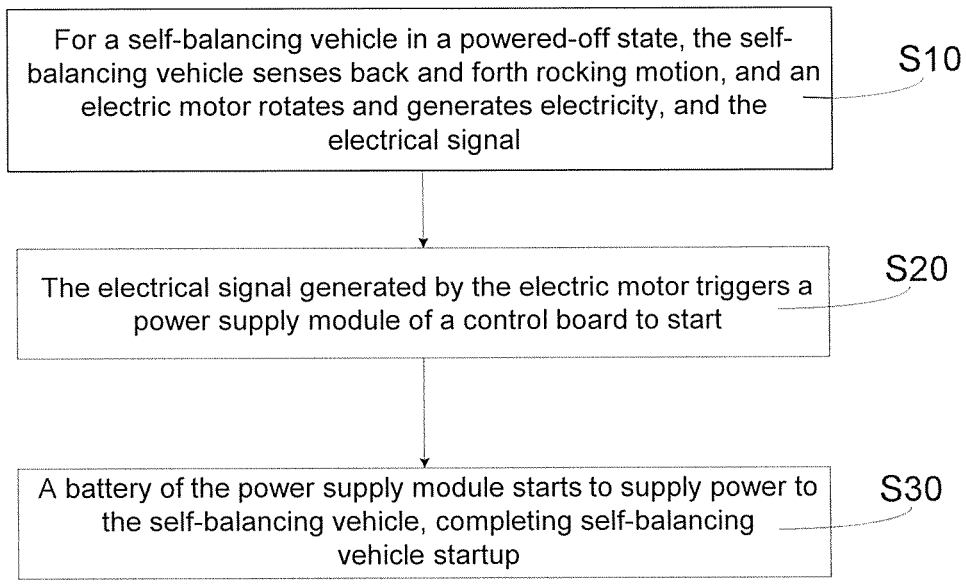
FIG. 1 is a flowchart of steps of a balance scooter startup method according to an embodiment of the present disclosure.

FIG. 1 is a flowchart of steps of a balance scooter startup method according to an embodiment of the present disclosure, including the following steps:

S10: For a balance scooter in a powered-off state, sense back and forth rocking motion of a user, and rotating an electric motor to generate electricity, and outputting an electrical signal.

If a user wants to use the balance scooter in a powered-off state, by rocking the wheels of the balance scooter back and forth, the back and forth rocking of the balance scooter makes the wheels rotate, to drive the electric motor connected to the wheels to rotate, and rotates the electric motor to generate electricity to generate an electrical signal.

S20: The electrical signal triggers the power supply module of the control board to start. By using the electrical signal generated by rotation of the electric motor to trigger the power supply module of the control board to start, the electrical signal generated by a rotate-to-generate-electricity attribute of the electric motor is effectively used to trigger the power supply module to enter a working state.

Figure 2:
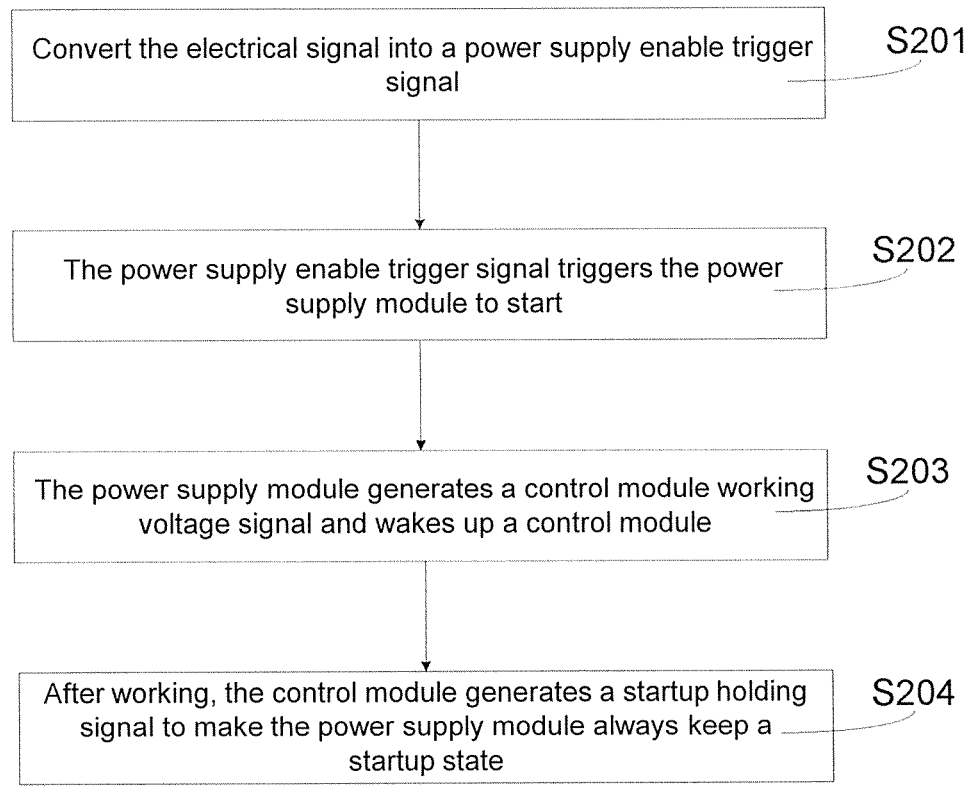
FIG. 2 is a flowchart of steps of triggering an electrical signal of a balance scooter startup method according to an embodiment of the present disclosure.

In an exemplary embodiment, referring to FIG. 2, the electrical signal triggering the power supply module of the control board to start may include the following steps.

S201: Convert the electrical signal into a power supply enable trigger signal.

S202: The power supply enable trigger signal triggers the power supply module to start.

S203: The power supply module generates a control module working voltage signal and wakes up a control module.

S204: After the control module starts, the control module generates a startup holding signal to make the power supply module always keeping an on state.

S30: A battery of the power supply module starts to power the balance scooter, completing the balance scooter startup.

According to the foregoing set balance scooter startup method, the working process is as follows. For example, a user that prepares to ride the balance scooter steps on the balance scooter by one foot, and rocks the balance scooter back and forth by the foot, so that the wheels of the balance scooter (with the electric motor) rotate. Certainly, the present disclosure is not limited to the form of stepping on the balance scooter by one foot. Stepping on the balance scooter by one foot to rock is also to make the wheels of the balance scooter to rotate, to drive the electric motor to rotate. Wheel rotation in other forms to make the electric motor generating electricity should also fall within the protection scope of the present disclosure. The power supply module is triggered and is started by the electrical signal generated by electricity generated by the rotary electric motor. After startup of the power supply module is triggered, a battery voltage V+ of the power supply module is converted into a working voltage VCC of the MCU of the control board, and the control board of the balance scooter starts to enter a running state from a powered off state. The MCU of the control board of the balance scooter in the running state generates a startup holding signal POWER_ON for feedback to the power supply module, so that the power supply module always keeps startup and the battery supplies power to it; in this case, the balance scooter is started and startup is completed.

In an embodiment, to effectively avoid a balance scooter mistaken startup operation caused by a misoperation of an external force within short time (for example, in a powered-off state, the misoperation of an external force causes a single fierce rocking, collision, vibration, slight movement, and other misoperations to the balance scooter), a time delay module is disposed between the electrical signal generated by the electric motor and the power supply module. Specifically, the time delay module is an RC time delay circuit, consisting of R1 and C1.

In an embodiment, to avoid a balance scooter mistaken startup operation caused by mistaken startup operation (for example, an infant slightly rocks the balance scooter with small force due to curiosity) when the balance scooter slightly rocks, a resistor R2 for a capacitor to discharge is disposed between the RC time delay circuit and the power supply module, and the resistor R2 is connected in parallel to C1.

In an embodiment, to avoid a false motion of the current of the startup holding signal of the power supply module for an electric motor coil, to effectively protect the electric motor and the power supply module, a diode D1 that prevents reverse current is connected in series between the electrical signal generated by the electric motor and the power supply module.

By rocking of the wheels to drive the electric motor to generate electricity, the electrical signal of electricity generated by the electric motor triggers the enable signal of the power supply module, to drive an MCU of the control board to generate the startup holding signal to make the power supply module always keep an on state. The balance scooter starts to power the battery module, to complete the startup motion. The startup process of the balance scooter is easy and is convenient for a user to use. By disposing the time delay module between the electrical signal generated by the electric motor and the power supply module, a balance scooter mistaken startup operation caused by a misoperation of an external force within short time is effectively avoided. By disposing the resistor for the capacitor of the time delay circuit to discharge between the time delay module and the power supply module, the mistaken startup operation when the balance scooter slightly shocks is avoided. By disposing the diode that prevents reverse current, a false motion of the current of the startup holding signal of the power supply module for an electric motor coil is avoided, to effectively protect the electric motor and the power supply module.

Figure 3:
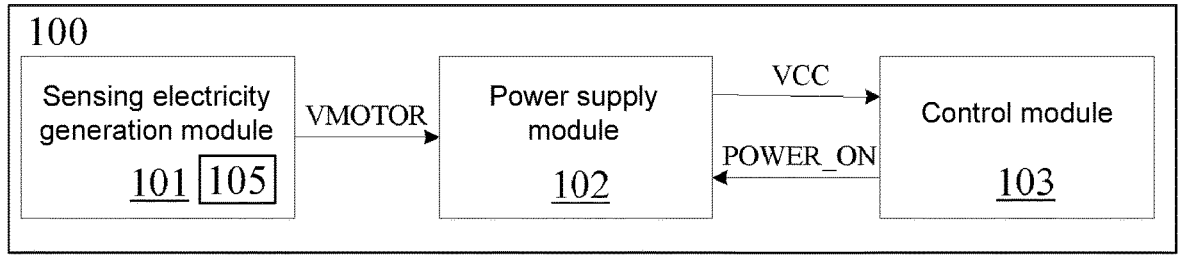
FIG. 3 is a principle block diagram of an apparatus controlling balance scooter startup according to an embodiment of the present disclosure.

Corresponding to the method embodiment, referring to FIG. 3, another embodiment of the present disclosure provides an apparatus controlling balance scooter 100 startup, including:

a sensing electricity generation module 101, for a balance scooter 100 in a powered-off state, sensing back and forth rocking motion of a user, and rotating an electric motor 105 to generate electricity, and outputting an electrical signal $V_{MOTOR}$;

a power supply module 102, receiving the electrical signal $V_{MOTOR}$ and outputting a control module working voltage signal $V_{CC}$; and a control module 103, receiving the control module working voltage signal $V_{CC}$ and being started, generating a startup holding signal POWER_ON to the power supply module 102, where a battery of the power supply module starts to power the balance scooter, to complete the balance scooter startup.

Figure 4:
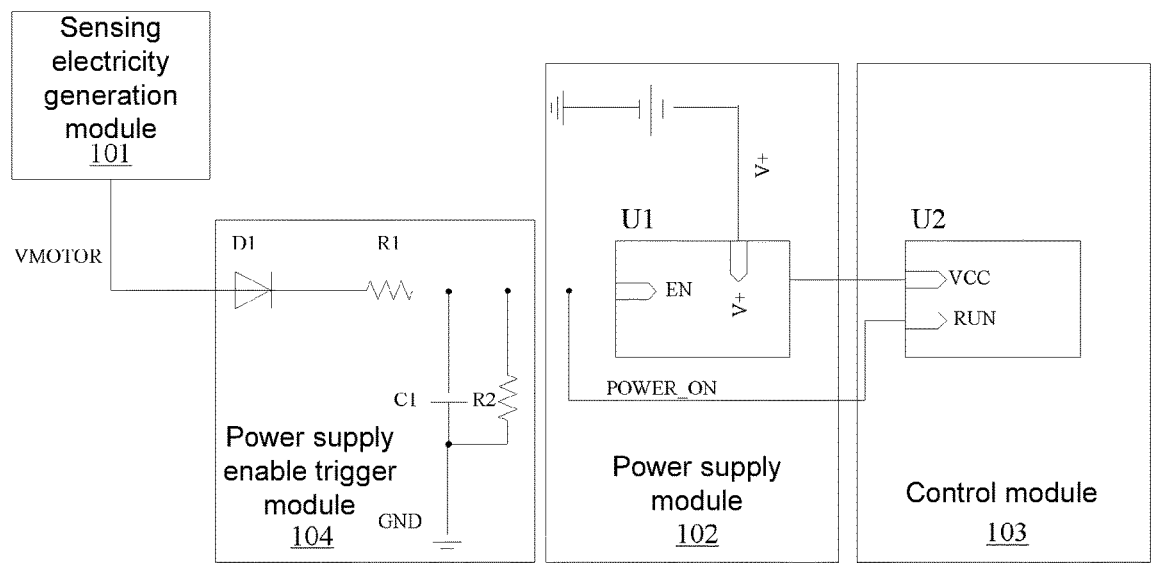
FIG. 4 is a schematic structural diagram of an apparatus controlling balance scooter startup according to an embodiment of the present disclosure.

Referring to FIG. 4, an apparatus controlling balance scooter startup of this embodiment of the present disclosure further includes a power supply enable trigger module 104, converting the electrical signal into the power supply enable trigger signal EN.

According to the foregoing set apparatus controlling balance scooter startup, the working process is as follows. For example, a user that prepares to ride the balance scooter steps on the balance scooter by one foot, and rocks the balance scooter back and forth by using one foot, so that the wheels of the balance scooter (with the electric motor) rotate. Certainly, the present disclosure is not limited to the form of stepping on the balance scooter by one foot. Stepping on the balance scooter by one foot to rock is also to make the wheels of the balance scooter rotate, provided that the electric motor is driven to rotate, and wheel rotation in other forms to make the electric motor generate electricity should also fall within the protection scope of the present disclosure. The electrical signal $V_{MOTOR}$ generated by electricity generated by the rotary electric motor is used to trigger startup of the power supply module, and after startup of the power supply module is triggered, a battery voltage V+ of the power supply module is converted into a working voltage VCC of the MCU of the control board, and the control board of the balance scooter starts to enter a running state from a powered off state; the MCU of the control board of the balance scooter in the running state generates a startup holding signal POWER_ON for feedback to the power supply module, so that the power supply module always keeps startup and the battery supplies power to the whole scooter; in this case, startup is completed. A person skilled in the art may understand that the power supply module and the control module may be both used as main modules through an integrated chip, and there is a plurality of types of integrated chips that can implement the function of the present disclosure.

Further referring to FIG. 4, in an exemplary implementation, the power supply enable trigger module includes a time delay module. The time delay module is an RC time delay circuit, and consists of a first resistor R1 and a first capacitor C1 connected in parallel, to avoid a balance scooter mistaken startup operation caused by a misoperation of an external force within short time (for example, in a powered-off state, the misoperation of an external force causes fierce rocking, collision, vibration, slight movement, and other misoperations for a single time). A second resistor R2 connected in parallel to the first capacitor is further included, and is disposed between the RC time delay circuit and the power supply module, for the capacitor C1 of the RC time delay circuit to discharge, to avoid a balance scooter mistaken startup operation caused by mistaken startup operation (for example, an infant slightly rocks the balance scooter with small force due to curiosity) when the balance scooter slightly rocks. A diode D1 is further included and is connected in series between the electrical signal and the power supply module, to prevent reverse current, and avoid a false motion of the current of the startup holding signal of the power supply module for an electric motor coil, to effectively protect the electric motor and the power supply module.

It should be understood that the exemplary embodiments described in the present disclosure is illustrative but not restrictive. Although one or more embodiments of this present disclosure with reference to the accompanying drawings are described, it will be apparent to those skilled in the art that various modifications and variations can be made to the forms and details of the present disclosure without departing from the scope or spirit of the present disclosure as defined by the appended claims.

What is claimed is:

1. A balance scooter startup method, comprising the following steps:
    for a balance scooter in a powered-off state, a sensing electricity generation sensor is configured to sense back and forth rocking motion of a user, and to rotate an electric motor to generate electricity, and to output an electrical signal;
    the electrical signal triggering a power supply of a control board to start;
    a battery of the power supply starting to power the balance scooter, completing the balance scooter startup.

2. The balance scooter startup method according to claim 1, wherein the electrical signal is specifically:
    converting the electrical signal into a power supply enable trigger signal;
    the power supply enable trigger signal triggering the power supply to start;
    the power supply generating a controller working voltage signal and waking up a controller; and
    after the controller starts, generating a startup holding signal to make the power supply always keeping an on state.

3. The balance scooter startup method according to claim 2, wherein the converting the electrical signal into the power supply enable trigger signal comprises: disposing an RC time delay circuit between the electrical signal and the power supply.

4. The balance scooter startup method according to claim 3, wherein a resistor for a capacitor of the RC time delay circuit to discharge is disposed between the RC time delay circuit and the power supply.

5. The balance scooter startup method according to claim 2, wherein the converting the electrical signal into a power supply enable trigger signal comprises: connecting a diode in series between the electrical signal and the power supply to prevent a reverse current.

6. An apparatus controlling balance scooter startup, comprising:
- a sensing electricity generation sensor, for a balance scooter in a powered-off state, sensing back and forth rocking motion of a user, and rotating an electric motor to generate electricity, and outputting an electrical signal;
- a power supply receiving the electrical signal and outputting a controller working voltage signal; and
- a controller, receiving the controller working voltage signal and being started, generating a startup holding signal to the power supply, wherein a battery of the power supply starts to power the balance scooter to complete the balance scooter startup.

7. The apparatus controlling balance scooter startup according to claim 6, further comprising a power supply enable trigger circuit, converting the electrical signal into a power supply enable trigger signal.

8. The apparatus controlling balance scooter startup according to claim 6, wherein the power supply enabling trigger circuit comprises an RC time delay circuit.

9. The apparatus controlling balance scooter startup according to claim 8, wherein the RC time delay circuit further comprises a resistor disposed between the RC time delay circuit and the power supply, for a capacitor of the RC time delay circuit to discharge.

10. The apparatus controlling balance scooter startup according to claim 6, further comprising a diode, connected in series between the electrical signal and the power supply, to prevent a reverse current.

\* \* \* \* \*